United States Patent
Stephen

[11] 3,896,146
[45] July 22, 1975

[54] 3,5-DIALKYL-4-HYDROXYPHENYLALKYL SUBSTITUTED TRICYCLIC IMIDES

[75] Inventor: John F. Stephen, New City, N.Y.

[73] Assignee: Ciba-Geigy Corporation, Ardsley, N.Y.

[22] Filed: Dec. 28, 1973

[21] Appl. No.: 429,233

[52] U.S. Cl.... 260/326 C; 260/45.8 N; 260/45.8 SN
[51] Int. Cl............................................. C07d 27/48
[58] Field of Search ................................ 260/326 C

[56] References Cited
UNITED STATES PATENTS
3,234,233   2/1966   Bolger................................. 260/326

Primary Examiner—Joseph A. Narcavage
Attorney, Agent, or Firm—Nestor W. Shust

[57] ABSTRACT

Compounds having the formula

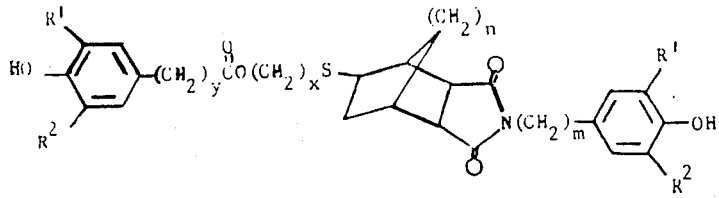

wherein
$R^1$ and $R^2$ are lower alkyl,
$n$ is 1 and 2,
$m$ is 0 to 3,
$x$ is 1 to 6 and
$y$ is 1 or 2, are good antioxidants of synthetic polymers. These compounds are prepared by reacting the appropriate exo-5-(ω-hydroxyalkylthio)-norbornane-endo-2,3-dicarboximide with the appropriate methyl 3,5-dialkyl-4-hydroxyphenylalkanoate.

7 Claims, No Drawings

3,5-DIALKYL-4-HYDROXYPHENYLALKYL SUBSTITUTED TRICYCLIC IMIDES

DETAILED DISCLOSURE

This invention relates to 3,5-dialkyl-4-hydroxyphenylalkyl substituted tricyclic imides and organic compositions stabilized therewith. More specifically, these compounds are useful as stabilizers of organic materials which are subject to oxidative and thermal degradation. The compounds of this invention can be represented by the formula

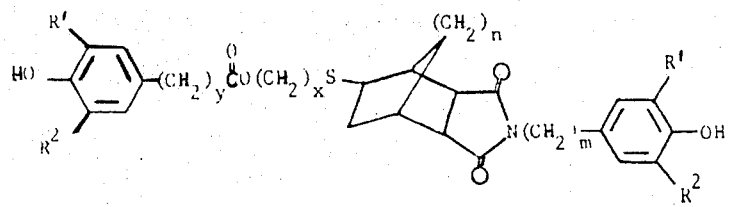

wherein
$R^1$ and $R^2$ are the same or different alkyl groups of 1 to 4 carbon atoms,
$m$ has a value of 0 to 3,
$n$ has a value of 1 or 2,
$x$ has a value of 1 to 6, and
$y$ has a value of 1 or 2.

The $R^1$ and $R^2$ groups can be any straight or branched chain alkyl having 1 to 4 carbon atoms, such as, methyl, ethyl, isopropyl, n-butyl and tert-butyl. Preferably these groups are methyl, isopropyl, and tert-butyl groups. Most preferably both groups are tert-butyl. The integer $n$ is preferably 1, $m$ is 0 or 1, $x$ is preferably 2, and $y$ is 1 or 2.

The above compounds wherein $m$ is 1 can be prepared from 5-norbornene-endo-2,3-dicarboximide whose preparation is described by Worrall, J. Am. Chem. Soc., 82, 5707 (1960). This compound is reacted with an ω-mercaptoalkanol to give the hydroxyalkylthio derivative which is then reacted with 2,6-dialkyl-4-dimethylaminomethylphenol. This intermediate is in turn reacted with methyl (3,5-dialkyl-4-hydroxyphenyl)-alkanoate in the presence of lithium hydride to give the final product.

The above compounds wherein $m$ is 0, 2 and 3 can be prepared by reacting the appropriate N-substituted-5-norbornene-endo- 2,3-dicarboximide with an ω-mercaptoalkanol to give the corresponding hydroxyalkylthio derivative. This intermediate is subsequently reacted with a methyl 3,5-dialkyl-4-hydroxyphenylalkanoate in the presence of a suitable transesterification catalyst such as lithium hydride to give the desired ester.

The preparation of the required N-substituted-5-norbornene-endo-2,3-dicarboximide is described in co-pending application Ser. No. 429,235 filed on the same day.

Illustrative examples of the compounds of this invention are

N-(3,5-di-tert-butyl-4-hydroxybenzyl)-exo-5-[2-{3,5-di-tert-butyl-4-hydroxyphenyl)-propionyloxy}-ethylthio]-norbornane-endo-2,3-dicarboximide.
N-(3,5-di-tert-butyl-4-hydroxybenzyl)-exo-5-[2-(3,5-di-tert-butyl-4-hydroxyphenylacetoxy)-ethylthio]-norbornane-endo-2,3-dicarboximide.
N-(3,5-di-tert-benzyl-4-hydroxyphenyl)-exo-5-[2-{3-(3,5-di-tert-butyl-4-hydroxyphenyl)-propionyloxy}-ethylthio]-norbornane-endo-2,3-dicarboximide.
N-(3,5-di-tert-butyl-4-hydroxyphenyl)-exo-5-[2-(3,5-di-tert-benzyl-4-hydroxyphenylacetoxy)-ethylthio]-norbornane-endo-2,3-dicarboximide.
N-(3,5-di-tert-butyl-4-hydroxyphenyl)-exo-5-[2-{3-(3-methyl-5-tert-butyl-4-hydroxyphenyl)-propionyloxy}-ethylthio]-norbornane-endo-2,3-dicarbiximide.

N-(3,5-di-tert-butyl-4-hydroxybenzyl)-exo-5-[2-{3-methyl-5-tert-butyl-4-hydroxphenyl)-propionyloxy}-ethylthio]-norbornane-endo-2,3-dicarboximide.
N-(3,5-di-tert-butyl-4-hydroxyphenyl)-exo-5-[6-{3-(3,5-di-tert-butyl-4-hydroxyphenyl)-propionyloxy}-n-hexylthio]-norbornane-endo-2,3-dicarboximide.

The following examples illustrate further the preparation of the above compounds without introducing any limitations.

EXAMPLE 1 exo-5-(2-hydroxyethylthio)-norbornane-endo-2,3-dicarboximide

In a nitrogen atmosphere, a solution of 2-mercaptoethanol (8.6g, 0.11 mole) in 20 ml of dioxane was added to a stirred solution of 5-norbornene-2,3-dicarboximide (16.3 g, 0.1 mole) in 100 ml of dioxane. The mixture was heated to 80° C and a solution of azobisisobutyronitrile (1.6g) in 20 ml of dioxane was added in portions over several hours. After the addition was completed the mixture was heated at 80° C overnight. Evaporation of the dioxane under reduced pressure and removal of excess 2-mercaptoethanol at ~1.0 mm. gave the title compound as an oily residue. The yield was quantitative.

EXAMPLE 2

N-(3,5-di-tert-butyl-4-hydroxybenzyl)-exo-5-(2-hydroxyethylthio) norbornane-endo-2,3-dicarboximide In a nitrogen atmosphere, a mixture of crude exo-5-(2-hydroxyethylthio)-norbornane-endo-2,3,dicarboximide (24.1g, 0.1 mole) and 2,6-di-tert-butyl-4-dimethylaminomethylphenol (35.0g, 0.13 mole) in 120 ml of N,N-dimethylformamide was stirred and heated at about 80° C for 18 hours. The cold mixture was poured into water and the oily precipitate which separated was extracted with ether. The other extract was washed with dilute hydrochloric acid, water, and finally dried over $Na_2SO_4$. Evaporation of the ether gave 45.0g of a glassy residue which was crystallized from benzene-cyclohexane mixture (1:1) to give 32.0g of product as a white solid, mp 90°–94° C.

EXAMPLE 3

N-(3,5-di-tert-butyl-4-hydroxybenzyl)-exo-5-[2-{3-(3,5-di-tert-butyl-4-hydroxyphenyl)-propionyloxy}-ethylthio]-norbornane-endo-2,3-dicarboximide In a nitrogen atmosphere, a stirred mixture of N-(3,5-di-tert-butyl-4-hydroxybenzyl)-exo-5-(2-hydroxyethylthio)-norbornane-endo-2,3-dicarboximide (9.2g, 0.02 mole) and lithium hydride (50 mg) was heated at 90° C for 20 minutes in a flask equipped with a Dean-Stark trap and a dry-ice condenser. Methyl 3-(3,5-di-tert-butyl-4-hydroxyphenyl)-propionate (5.84g, 0.02 mole) was added. The mixture was heated at 155°-160° C under vacuum (12mm) for 5.5 hours. Upon cooling to 50° C 1 ml of acetic acid was added and the mixture was dissolved in ether. The ether solution was washed with dilute aqueous sodium carbonate and water. The dried ($Na_2SO_4$) solution was evaporated under reduced pressure to give 14.0g of an oily residue which was chromatographed on 300g of silica gel. In this was was obtained 8.8g of the product as an amber colored glass which was heated at 90°/0.05 mm for 17 hours prior to analysis.

Anal. Calcd for $C_{43}H_{61}NO_6S$: C, 71.73; H, 8.54; N, 1.95. Found: C, 71.77; H, 8.79; N, 1.94.

EXAMPLE 4

N-(3,5-di-tert-butyl-4-hydroxybenzyl)-exo-5-[2-(3,5-di-tert-butyl-4-hydroxyphenylacetoxy)-ethylthio]-norbornane-endo-2,3-dicarboximide The procedures of Example 2 and 3 are followed except for employing in Example 3 methyl 3,5-di-tert-butyl-4-hydroxyphenylacetate. The resulting compound is the above named product.

EXAMPLE 5

N-(3,5-di-tert-butyl-4-hydroxyphenyl)-exo-5-[2- 3-(3,5-di-tert-butyl-4-hydroxyphenyl)-propionyloxy - ethylthio]-norbornane-endo-2,3-dicarboximide 5-norbornene-endo-2,3-dicarboxylic anhydride is reacted with 3,5-di-tert-butyl-4-aminophenol in a toluene to give N-(3,5-di-tert-butyl-4-hydroxyphenyl)-5-norbornene-endo-2,3-dicarboximide. This preparation is described in greater detail in copending application Ser. No. 429,235 filed on the same day. Said compound is reacted with 2-mercaptoethanol in the presence of azobisisobutyronitrile in dioxane to give N(3,5-di-tert-butyl-4-hydroxyphenyl)-exo-5-(2-hydroxyethylthio)-norbornane-endo-2,3-dicarboximide. The latter compound is reacted with methyl 3-(3,5-di-tert-butyl-4-hydroxyphenyl) propionate in the presence of lithium hydride (transesterification reaction) yielding the above named product.

Following the same procedure, there is also prepared N-(3,5-di-tert-butyl-4-hydroxyphenyl)-exo-5-[2-(3,5-di-tert-butyl-4-hydroxyphenylacetoxy)-ethylthio]-norbornene-endo-2,3-dicarboximide.

The compounds of this invention are stabilizers of organic material normally subject to thermal, oxidative or actinic light deterioration. Materials which are thus stabilized include synthetic organic polymeric substances including homopolymers, copolymers, and mixtures thereof, such as vinyl resins formed from the polymerization of vinyl halides or from the copolymerization of vinyl halides with unsaturated polymerizable compounds, e.g., vinyl esters, α, β-unsaturated acids, α, β-unsaturated esters, α, β- unsaturated ketones, α, β-unsaturated aldehydes and unsaturated hydrocarbons such as butadienes and styrene; poly-α-olefins such as high and low density polyethylene, cross-linked polyethylene, polypropylene, poly(4-methylpentene-1 and the like, including copolymers of α-olefins: such as ethylene-propylene copolymers, and the like; dienes such as polybutadiene, polyisoprene, and the like, including copolymers with other monomers; polyurethanes such as are prepared from polyols and organic polyisocyanates, and polyamides such as polyhexamethylene adipamide and polycaprolactam; polyesters such as polyethylene terephthalates; polycarbonates such as those prepared from bisphenol-A and phosgene; polyacetals such as polyethylene terephthalate polyacetal; polystyrene, polyethyleneoxide; polyacrylics such as polyacrylonitrile; polyphenyleneoxides such as those prepared from 2,6-dimethylphenol and the like; and copolymers such as those of polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di(1,2-ethylene)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like; and alkylene glycols, e.g., β-methoxyethyleneglycol, methoxytriethyleneglycol, triethylene glycol, octaethyleneglycol, dibutyleneglycol, dipropyleneglycol and the like.

The compounds of this invention are particularly useful as antioxidants and thermal stabilizers for the protection of polyolefins, for instance, polyethylene, polypropylene, poly(butene1), poly(pentene-1), poly (3-methylbutene-1), poly (4-methylpentene-1), various ethylene-propylene copolymers and the like.

In general, the stabilizers of this invention are employed from about 0.01 to about 5 percent by weight of the stabilized composition, although this will vary with the particular substrate and application. An advantageous range is from about 0.05 to about 2 percent and especially 0.1 to about 1 percent.

For addition to polymeric substrates, the stabilizers can be blended before polymerization or after polymerization, during the usual processing operations, for example, by hot-milling, the composition then being extruded, pressed, blow molded or the like into films, fibers, filaments, hollow spheres and the like. The heat stabilizing properties of these compounds may advantageously stabilize the polymer against degradation during such processing at the high temperature generally encountered. The stabilizers can also be dissolved in suitable solvents and sprayed on the surface of films, fabrics, filaments or the like to provide effective stabilization. Where the polymer is prepared from a liquid monomer as in the case of styrene, the stabilizer may be dispersed or dissolved in the monomer prior to polymerization or curing.

These compounds can also be used in combination with other additives such as antioxidants, sulfur-containing esters such as distearyl-β-thiodipropionate (DSTDP), dilauryl-62 -thiodipropionate (DLTDP) in an amount of from 0.01 to 2 percent by weight of the organic material, and the like, pourpoint depressants, corrosion and rust inhibitors, dispersing agents, demulsifiers, antifoaming agents, fillers such as glass or other fibers, carbon black, accelerators and the other chemicals used in rubber compounding, plasticizers, color stabilizers, di- and tri-alkyl- and -alkylphenylphosphites, heat stabilizers, ultraviolet light stabilizers, antiozonants, dyes, pigments, metal chelating agents, dyesites and the like. Often combinations such as these, particularly the sulfur containing esters, the phosphites and/or the ultraviolet light stabilizers will produce superior results in certain applications to those expected by the properties of the individual components.

The following formula represents co-stabilizers which are in certain instances very useful in combination with the stabilizers of this invention:

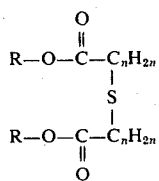

wherein R is an alkyl group having from 6 to 24 carbon atoms; and $n$ is an integer from 1 to 6. Especially useful compounds of this type are dilauryl-$\beta$-thiodipropionate and distearyl-$\beta$-thiodipropionate. The above co-stabilizers are used in the amount of from 0.01 to 2 percent by weight of the organic material, and preferably from 0.1 to 1 percent.

Although the compounds of this invention may to some degree also be effective as thermal stabilizers, if the processing of the polymer is carried out at high temperatures it is advantageous to incorporate additional antioxidants.

In most applications, it is desirable to incorporate into the resin composition, sufficient thermal antioxidants to protect the plastic against thermal and oxidative degradation. The amount of antioxidant required will be comparable to that of the actinic stabilizer. Namely, from about 0.005 percent to 5 percent and preferably from 0.01 percent to 2 percent by weight. Representative of such antioxidants are phosphite esters, such as triphenylphosphite and dibutylphosphite and alkyl arylphosphites such as dibutylphenylphosphite, and the like.

EXAMPLE 6

Unstabilized polypropylene poweder (Hercules Profax 6501) was thoroughly blended with 0.2 percent by weight N-(3,5-di-tert-butyl-4-hydroxybenzyl)-exo-5-[2-{3,5-di-tert-butyl-4-hydroxyphenyl)-propionyloxy}-ethylthio]-norbornane-endo-2,3-dicarboximide. Also prepared were samples of polypropylene containing 0.1 percent by weight of the same stabilizer and 0.3 percent by weight of DSTDP (distearyl-$\beta$-thiodipropionate). The blended materials were then milled on a two-roll mill at 182° C for 10 minutes, after which time the stabilized polypropylene was sheeted from the mill and allowed to cool.

The milled polypropylene sheets were then cut into pieces and pressed for 7 minutes on a hydraulic press at 218° C, 2,000 pounds per square inch pressure. The resulting plaques of 25 mil thickness were tested for resistance to accelerated aging in a forced draft oven at 150° C. When the plaques showed the first signs of decomposition (e.g., cracking or brown edges) they were considered to have failed. The results were as follows:

| | |
|---|---|
| No stabilizer | 3 hrs. |
| 0.2% stabilizer | 1150 hrs. |
| 0.1% stabilizer and 0.3% DSTDP | 1925 hrs. |

Comparatively good stabilization is obtained when the concentration of the stabilizer is 0.05 percent and 1 percent.

EXAMPLE 7

Pellets (500 g) of unstabilized nylon-6,6 (Zytel 101, DuPont) are placed in a Kitchen Aid Mixer. With mixing a solution of 0.5% (based on the weight of nylon) of N-(3,5-di-tert-butyl-4-hydroxyphenyl)-exo-5-[2-{3,5-di-tert-butyl-4-hydroxyphenyl)-propionyloxy}-ethylthio]-norbornane-endo-2,3-dicarboximide in 20 ml of methylene chloride is added slowly. Sodium hypophosphite (0.5 gm 0.1 percent) is dissolved in 20 ml of water and added slowly with mixing to the nylon pellets after the antioxidant solution has been added and most of the methylene chloride has evaporated. The stabilized pellets are dried at 80° C at << 1 mm Hg. for 4 hours.

The polyamide formulation is extruded at 600° F (316° C) through at ¼ inch die into a rod which is water cooled and chopped nnot pellets. A ¾ inch Brabender extruder, equipped with a nylon screw, is used. The pellets are dried at 80° C at < 1 mm for 4 hours.

The dried pellets are compression molded into 5 mil thick film by pressing at 290° C for 4 minutes at 6,000 psi. The films are oven aged at 150° C in a forced draft oven and samples are removed periodically. The specific viscosity of the samples are determined using a 1% formic acid solution at 25° C. The sample stabilized with the above noted stabilizer required longer aging time to reduce its viscosity by one-half than the unstabilized sample.

EXAMPLE 8

Ustabilized high impact polystyrene resin is dry blended with 0.01% by weight of the resin of N-(3,5-di-tert-butyl-4-hydroxybenzyl)-exo-5-[2-{3-(3-methyl-5-tert-butyl-4-hydroxyphenyl)-propionyloxy}-ethylthio]-norbornane-endo-2,3-dicarboximide. The resin is then extrusion compounded on a 1 inch 24/1=L/D extruder, melt temperature 500° F (260° C) and pressed for 7 minutes at a temperature of 163° C and a pressure of 2000 psi into a sheet of uniform thickness of 30 mil. The sheets are then cut into plaques of 2 inch × 2 inch. The plaques are then oven aged at 80° C and color measurements made periodically using a Hunter Color Difference Meter Model D25. The polystyrene samples stabilized with the above stabilizer developed the undesirable yellow discoloration substantially later after such discoloration occurred in the unstabilized samples.

EXAMPLE 9

Unstabilized linear polyethylene is solvent blended in methylene chloride with 0.5% by weight of the substrate of N-(3,5-di-tert-butyl-4-hydroxyphenyl)-exo-5-[2-(3,5-di-tert-butyl-4-hydroxyphenylacetoxy)- ethylthio]-norbornane-endo-2,3-dicarboximide and then vacuum dried. The resin is then extruded at 550° F (284° C) using a 3/4 inch extruder having 5 times 24:1 L/D ratio. The melt flow rate of a sample of the resin is determined after each extrusion according to ASTM test D-1238. Polyethylene stabilized with above compound is found to undergo less change in the melt flow rate than the unstabilized polyethylene.

What is claimed is:

1. A compound having the formula

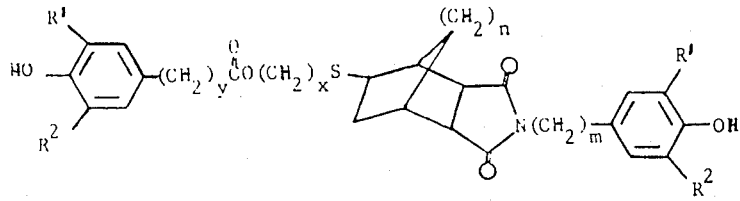

wherein
R$^1$ and R$^2$ are the same or different alkyl groups of 1 to 4 carbon atoms,
$m$ has a value of 0 to 3,
$n$ has a value of 1 and 2,
$x$ has a value of 1 to 6, and
$y$ has a value of 1 or 2.

2. A compound of claim 1 wherein R$^1$ and R$^2$ are methyl, isopropyl or tert-butyl groups.

3. A compound of claim 2 wherein $m$ is 0 or 1, $n$ is 1, $x$ is 2 and $y$ is 1 or 2.

4. The compound of claim 1 which is N-(3,5-di-tert-butyl-4-hydroxybenzyl)-exo-5-[2-{3-(3,5-di-tert-butyl-4-hydroxyphenyl)-propionyloxy}-ethylthio]-norbornane-endo-2,3-dicarboximide.

5. The compound of claim 1 which is N-(3,5-di-tert-butyl-4-hydroxybenzyl)-exo-5-[2-(3,5-di-tert-butyl-4-hydroxyphenactoxy)-ethylthio]-norbornane-endo-2,3-dicarboximide.

6. The compound of claim 1 which is N-(3,5-di-tert-butyl-4-hydroxyphenyl)-exo-5-[2-{3-(3,5-di-tert-butyl-4-hydroxyphenyl)-propionyloxy}-ethylthio]-norbornane-endo-2,3-dicarboximide.

7. The compound of claim 1 which is N-(3,5-di-tert-butyl-4-hydroxyphenyl)-exo-5-[2-(3,5-di-tert-butyl-4-hydroxyphenylacetoxy)-ethylthio]-norbornane-endo-2,3-dicarboximide.

* * * * *